(12) United States Patent
Abdallah et al.

(10) Patent No.: US 6,584,549 B2
(45) Date of Patent: Jun. 24, 2003

(54) SYSTEM AND METHOD FOR PREFETCHING DATA INTO A CACHE BASED ON MISS DISTANCE (75) Inventors: Mohammad A. Abdallah, Folsom, CA (US); Khalid Al-Dajani, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 98 days.

(21) Appl. No.: 09/749,936

(22) Filed: Dec. 29, 2000

(65) Prior Publication Data

US 2002/0087800 A1 Jul. 4, 2002

(51) Int. Cl.$^7$ .............................................. G06F 12/00
(52) U.S. Cl. ...................................................... 711/137
(58) Field of Search .......................................... 711/137

(56) References Cited

U.S. PATENT DOCUMENTS 5,790,823 A * 8/1998 Puzak et al. ................ 712/207
6,055,622 A    4/2000 Spillinger
6,253,306 B1   6/2001 Ben-Meir et al.

FOREIGN PATENT DOCUMENTS

EP   0 402 787 A2   12/1990
EP   1 031 919 A2   8/2000

* cited by examiner

Primary Examiner—Jack A. Lane
(74) Attorney, Agent, or Firm—Kenyon & Kenyon (57) ABSTRACT

A prefetcher to prefetch data for an instruction based on the distance between cache misses caused by the instruction. In an embodiment, the prefetcher includes a memory to store a prefetch table that contains one or more entries that include the distance between cache misses caused by an instruction. In a further embodiment, the addresses of data elements prefetched are determined based on the distance between cache misses recorded in the prefetch table for the instruction.

28 Claims, 8 Drawing Sheets

| ENTRY # 310 | INSTR. IP FIELD 301 | LAST MISS ADDRESS FIELD 302 | MISS DISTANCE FIELD 303 | MISS REPEATED FIELD 304 | CONFIRMED FIELD 305 |
|---|---|---|---|---|---|
| 1 | XXXX | 1030 | 30 | | |
| 2 | | | | | |
| 3 | | | | | |
| 4 | | | | | |
| 5 | | | | | |
| 6 | | | | | |
| 7 | | | | | |
| 8 | | | | | |

CRITICAL MISS PREFETCH TABLE 300

CRITICAL MISS PREFETCH TABLE 510

| INSTR. IP FIELD 511 | LAST MISS ADDRESS FIELD 512 | MISS DISTANCE FIELD 513 | MIS-MATCH FIELD 514 | CONFIRMED FIELD 515 |
|---|---|---|---|---|
| XXXX | 1030 | 30 | | |

SINGLE MISS TABLE 520

| INSTR. IP FIELD 521 |
|---|
| XXXX |
| YYYY |
| ZZZZ |
| ••• |

| INSTR. IP FIELD 701 |
|---|
| XXXX |
|  |
|  |
|  |
|  |
|  |
|  |
|  |
|  |

FRONT END TABLE 710

| LAST MISS ADDRESS FIELD 702 | MISS DISTANCE FIELD 703 | MISS REPEATED FIELD 704 | CONFIRMED FIELD 705 |
|---|---|---|---|
| 1030 | 30 |  |  |
|  |  |  |  |
|  |  |  |  |
|  |  |  |  |
|  |  |  |  |
|  |  |  |  |
|  |  |  |  |
|  |  |  |  |
|  |  |  |  |

BACK END TABLE 720

SYSTEM AND METHOD FOR PREFETCHING DATA INTO A CACHE BASED ON MISS DISTANCE

FIELD OF THE INVENTION

Embodiments of the present invention relate to prefetching data from a memory. In particular, the present invention relates to methods and apparatus for prefetching data from a memory for use by a processor.

BACKGROUND

Instructions executed by a processor often use data that may be stored in a memory device such as a Random Access Memory (RAM). For example, a processor may execute a LOAD instruction to load a register with data that is stored at a particular memory address. In many systems, because the access time for the system memory is relatively slow, frequently used data elements are copied from the system memory into a faster memory device called a cache and, if possible, the processor uses the copy of the data element in the cache when it needs to access (i.e., read to or write from) that data element. If the memory location that is accessed by an instruction has not been copied into a cache, then the access to the memory location by the instruction is said to cause a "cache miss" because the data needed could not be obtained from the cache. Computer systems operate more efficiently if the number of cache misses is minimized.

One way to decrease the time spent waiting to access a RAM is to "prefetch" data from the RAM memory before it is needed and, thus, before the cache miss occurs. Many processors have an instruction cycle in which instructions to be executed are obtained from memory in one step (i.e., an instruction fetch) and executed in another step. If the instruction to be executed accesses a memory location (e.g., a memory LOAD), then the data at that location must be fetched into the appropriate section of the processor from a cache or, if a cache miss, from a system memory. A cache prefetcher attempts to anticipate which data addresses will be accessed by instructions in the future and prefetches the data to be accessed from the memory before the data is needed. This prefetched data may be stored in a cache or buffer for later use.

Prior prefetching schemes determine a "stride" for memory instructions such as LOAD's and then prefetch data using this stride. The stride for an instruction in a program may be defined as the distance between the memory addresses loaded by two consecutive executions of the instruction. As used herein, "instruction" refers to a particular instance of an instruction in the program, with each instruction being identified by a different instruction pointer ("IP") value. Stride based prefetch schemes are premised on the theory that an instruction will access a series of memory locations that are the same distance apart from one another. This prediction is often accurate if, for example, the program is in a loop or nested loop or is stepping though a table.

DETAILED DESCRIPTION

Embodiments of the present invention relate to a prefetcher which prefetches data for an instruction based on the distance between cache misses caused by the instruction. In an embodiment, the prefetcher builds a prefetch table that records the distance between consecutive cache misses for instructions. This distance is the stride for the cache misses and may be referred to as a "miss distance" for the instruction. If the miss distance for an instruction occurs in a pattern, then misses occurring according to this pattern may be referred to as "critical cache misses." After an instruction causes a "current cache miss", the prefetcher of this embodiment may request prefetching of the data located at the miss distance away from the address of the data that caused the current cache miss. This data will then be available for future use. The miss distance may be stored in a critical cache miss prefetch table.

A critical cache miss management policy such as described enables the use of a smaller table size than in previous prefetchers while maintaining to a large extent the performance advantages of previous prefetching mechanisms. The critical cache miss prefetcher achieves these efficient results because it does not store strides and addresses for LOAD instructions that do not generally cause misses. In addition, the prefetcher does not need to check for a cache miss for data that generally does not cause a cache miss even thought it is within the stride.

Embodiments of the invention obtain further performance improvements by filtering out misses that are not part of a miss pattern. Such misses may be referred to as "cold misses" or "noise misses." In an embodiment, the address that caused a miss for an instruction is not even recorded unless at least two misses are detected for that instruction. In a further embodiment, prefetching is not performed for an instruction until the miss distance is confirmed. In a still further embodiment, the miss distance stored in the critical miss prefetch table is not recalculated for an instruction unless two consecutive misses occur at a distance different than the miss distance. A more detailed description of these and other embodiments is provided below.

Figure 1:
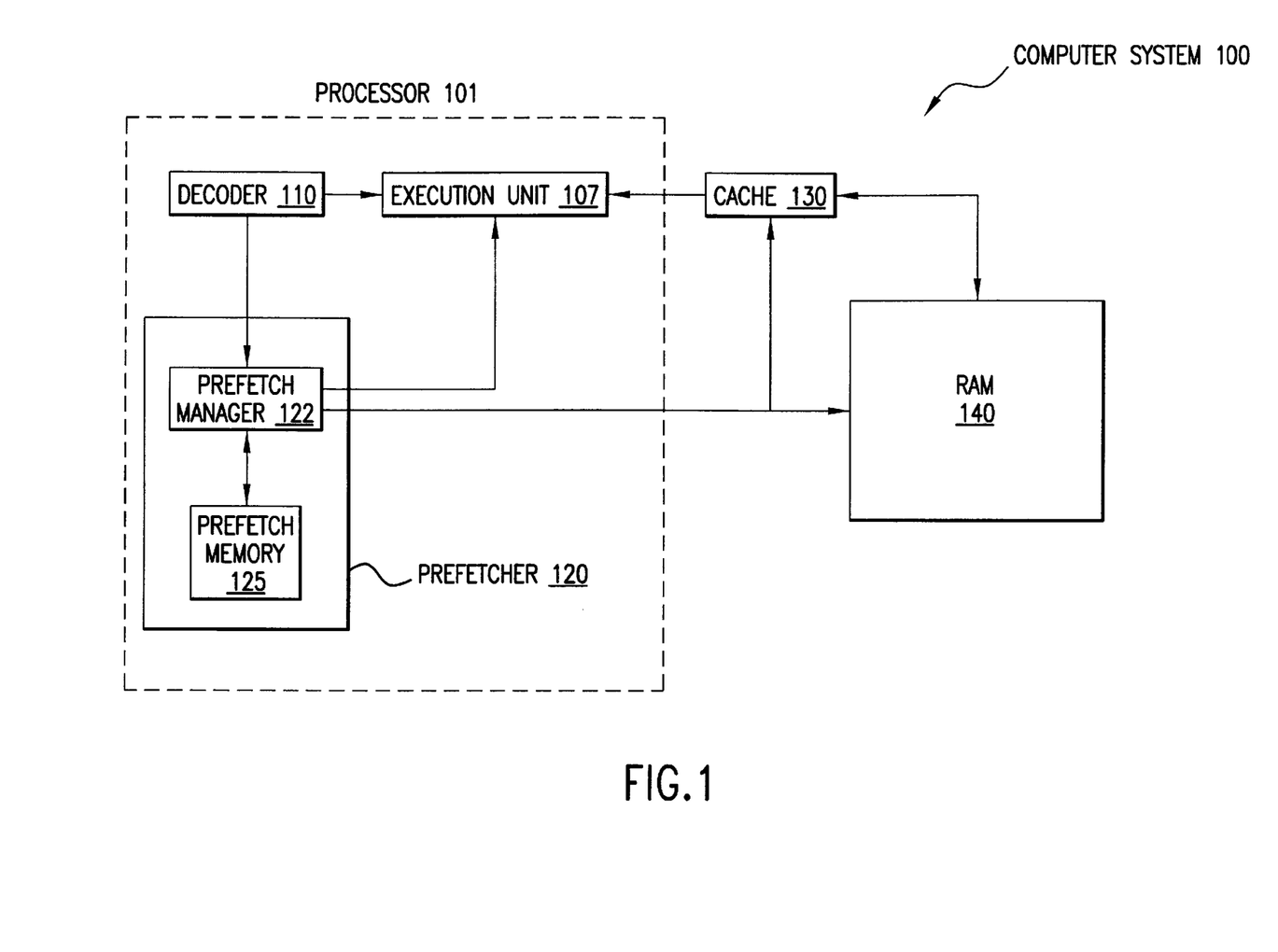
FIG. 1 is a partial block diagram of a computer system having a prefetcher according to an embodiment of the present invention.

FIG. 1 is a partial block diagram of a computer system 100 having a prefetcher 120 according to an embodiment of the present invention. Computer system 100 includes a processor 101 that has a decoder 110 that is coupled to prefetcher 120. Computer system 100 also has an execution unit 107 that is coupled to decoder 110 and prefetcher 120. The term "coupled" encompasses a direct connection, an indirect connection, an indirect communication, etc. Processor 101 may be may be any micro-processor capable of processing instructions, such as for example a general purpose processor in the INTEL PENTIUM family of processors. Execution unit 107 is a device which performs instructions. Decoder 110 may be a device or program that changes one type of code into another type of code that may be executed. For example, decoder 110 may decode a LOAD instruction that is part of a program, and the decoded LOAD instruction may then Access Memory (RAM) 140. RAM 140 is a system memory. In other embodiments, a type of system memory other than a RAM may be used in computer system 100 instead of or in addition to RAM 140. Cache 130 may be a Static Random Access Memory (SRAM). In another embodiment, cache 130 may be part of processor 101.

Prefetcher 120 includes a prefetch manager 122 and a prefetch memory 125. Prefetch manager 122 may include logic to prefetch data for an instruction based on the distance between cache misses caused by the instruction. As used in this application, "logic" may include hardware logic, such as circuits that are wired to perform operations, or program logic, such as firmware that performs operations. Prefetch memory 125 may store a critical miss prefetch table containing entries that include the distance between cache misses caused by an instruction. In an embodiment, prefetch memory 125 is a content addressable memory (CAM). Examples of critical miss prefetch tables are discussed below with reference to FIGS. 3, 5, and 7. Prefetch manager 122 may determine the addresses of data elements to be prefetched based on the miss distance that is recorded for instructions in the prefetch table.

Figure 2:
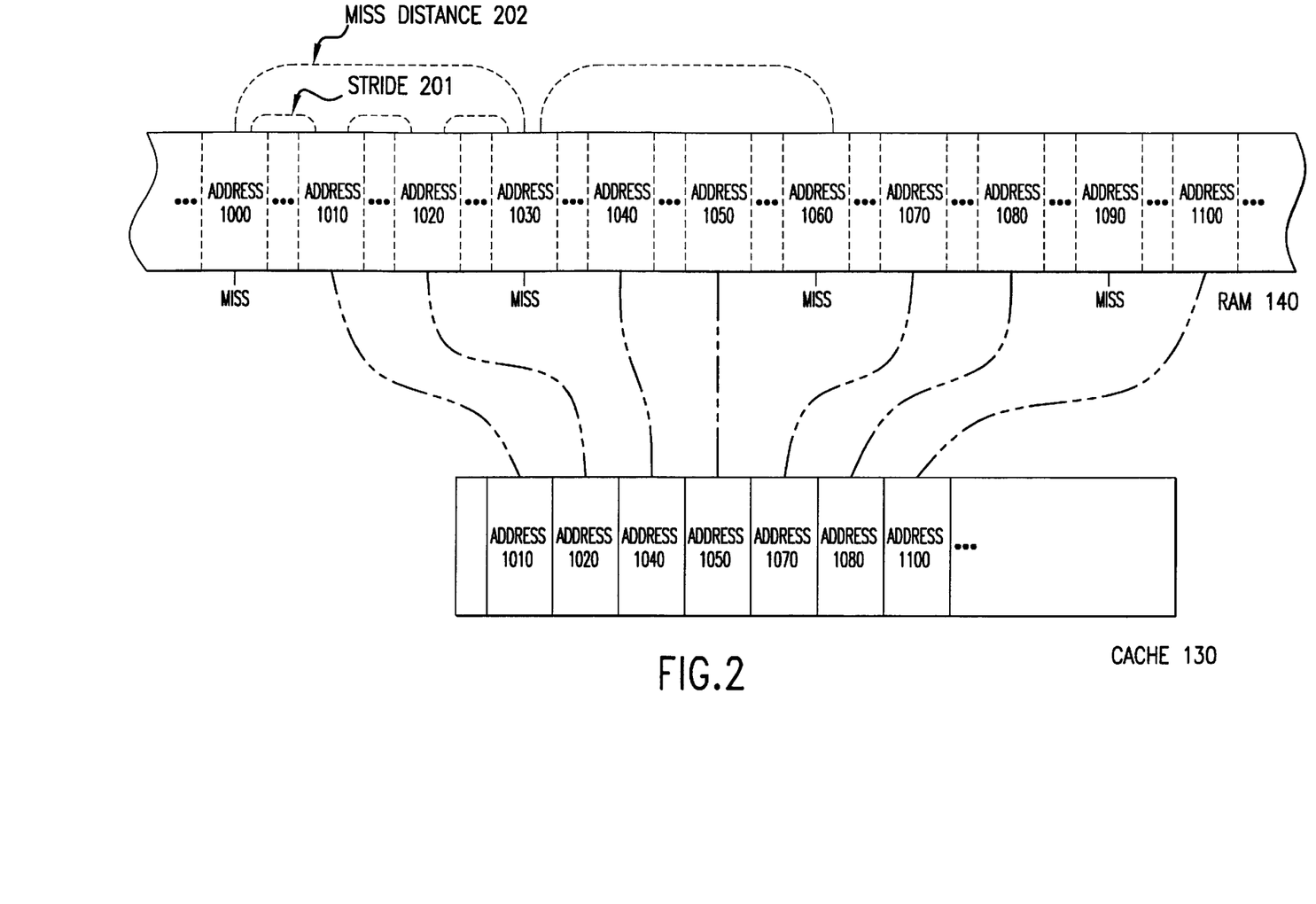
FIG. 2 is a partial block diagram of a series of addresses in a memory and a cache according to an embodiment of the present invention.

FIG. 2 is a partial block diagram of a series of addresses in a memory and a cache according to an embodiment of the present invention. FIG. 2 shows a part of RAM 140 and cache 130. RAM 140 contains a series of memory cells or locations that each have a unique address. In FIG. 2, every tenth address in the series from address 1000 to 1100 is labeled with the address number. FIG. 2 shows that a copy of the data in address 1010, 1020, 1040, 1050, 1070, 1080, and 1100 of RAM 140 is stored in cache 130.

FIG. 2 is used herein to illustrate the cache miss pattern for an instruction that is repeatedly executed by processor 101. The instruction may be, for example, a particular LOAD instruction in a program. This instruction may be identified by an instruction pointer value which will be referred to generically as IP=XXXX. In an example program, the instruction is executed repeatedly by the processor 101 in a relatively short time span. This typically occurs if the instruction is part of a loop, but it also may occur in other cases. The LOAD instruction at IP=XXXX used in this example may load the data element stored at a different memory address each time that the LOAD instruction is executed. In the example illustrated in FIG. 2, assume that the instruction begins by loading from address 1000 and that the instruction has a stride 201 of ten. That is, during the relevant part of the program in question, the instruction in this example first loads from address 1000 and then loads from every tenth location that follows (e.g., 1000, 1010, 1020, 1030, 1040, 1050, 1060, 1070, 1080, 1090, 1100, ...).

When the LOAD instruction of this example goes though the execution cycle, processor 101 will attempt to obtain the data needed to execute the LOAD instruction from cache 130. In the example shown in FIG. 2, the data needed to execute the LOAD instruction when loading from addresses 1010, 1020, 1040, 1050, 1070, 1080, and 1100 is in the cache. These addressed may be said to be "cached." For simplicity, in this example the address are stored in the cache in the order that they appear in RAM 140, but of course they may be stored in cache 130 in any order. FIG. 2 shows that addresses 1000, 1030, 1060, and 1090 are not cached. Thus, a cache miss will occur when the LOAD instruction loads from addresses 1000, 1030, 1060, and 1090. In this example, the miss distance 202 between the first address in the series of addresses that caused a cache miss and the next address that caused a cache miss is 30 (i.e., 1030−1000=30).

A critical miss prefetcher according to one embodiment of this invention prefetches the data which would result in a cache miss when executing the LOAD instruction at IP=XXXX. In an embodiment, this data is prefetched by the prefetched. based on information from a critical miss prefetch table that may be stored in prefetch memory 125.

Figure 3:
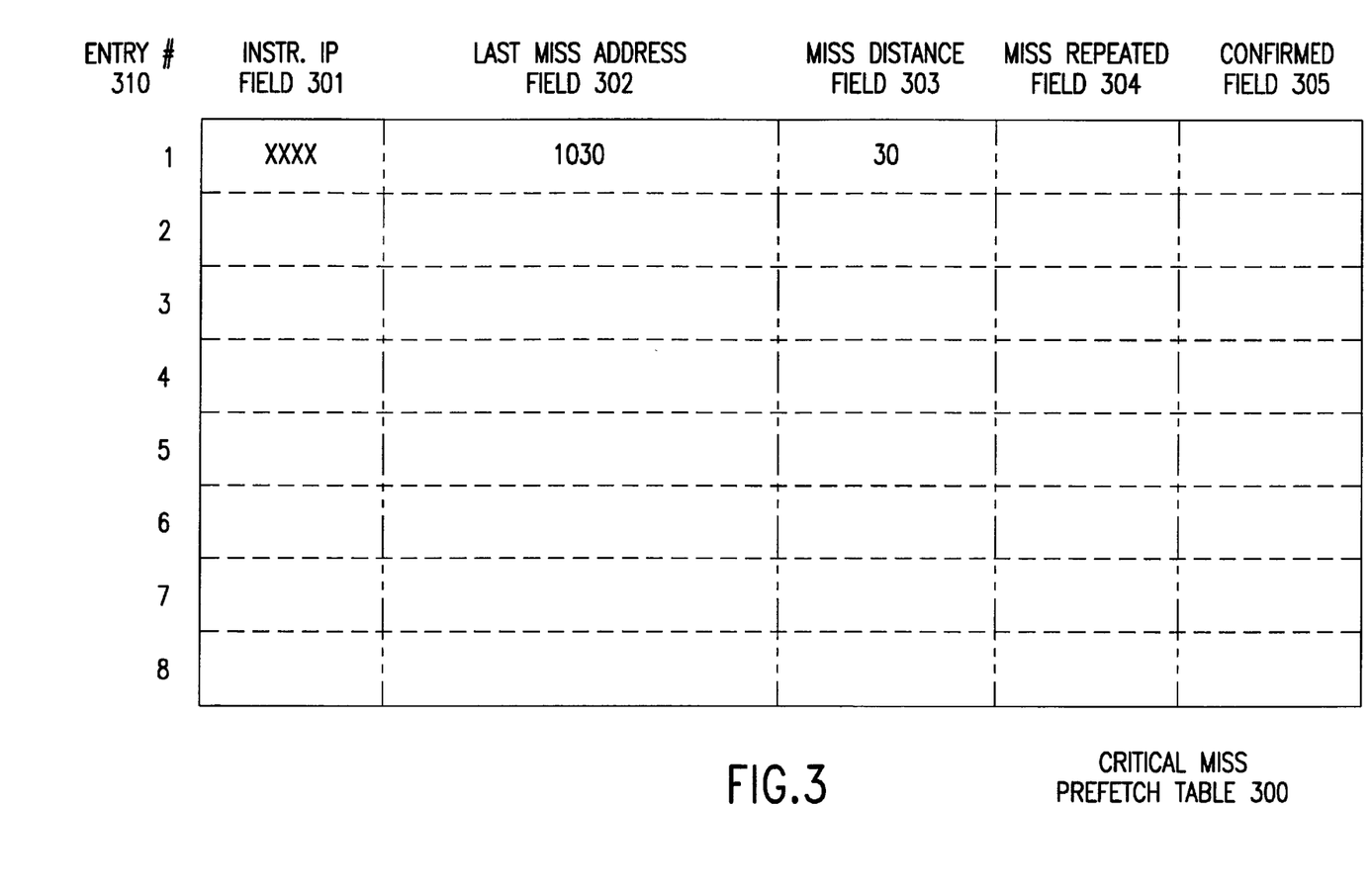
FIG. 3 is a partial block diagram of a critical miss prefetch table according to an embodiment of the present invention.

FIG. 3 is a partial block diagram of a critical miss prefetch table 300 according to an embodiment of the present invention. Critical miss prefetch table has eight entries which are shown with an entry number 310 of 1 to 8, although in this embodiment the entry number is for illustration purposes only and is not a field in the table. In another embodiment, critical miss prefetch table 300 may have more or less entries. Each entry may contain information for one instruction. As shown in FIG. 3, critical miss prefetch table 300 has five fields, but it may have more or less fields in other embodiments. The first field in critical miss prefetch table 300 is instruction IP field 301. This field contains the instruction pointer of the instruction to which the entry is related. As shown in FIG. 3, the first entry stores the instruction pointer value of XXXX. The next field in critical miss prefetch table 300 is a last miss address field 302. This field stores the address of the last cache miss for the instruction. The example shown in FIG. 3 contains a last miss address of 1030, which indicates that the last addressed missed when executing the LOAD instruction at P=XXXX was the address 1030. The next field in critical miss prefetch table 300 is the miss distance field 303. In an embodiment, this field stores the distance between the last two successive cache misses for the instruction. For example, if the first cache miss occurred when loading address 1000, and the next cache miss occurred when loading address 1030, then the miss distance stored in miss distance field 303 is 30.

The next fields in critical miss prefetch table 300 are the miss repeated field 304 and the confirmed field 305. These fields may be used by an embodiment of the invention that includes a noise filter to prevent the contamination of the critical miss prefetch table 300 and/or the miss data by noise misses. In an embodiment, these fields are each one bit. The operation of these fields, and the general operation of a critical miss prefetcher, is discussed below with reference to FIG. 4.

Figure 4:
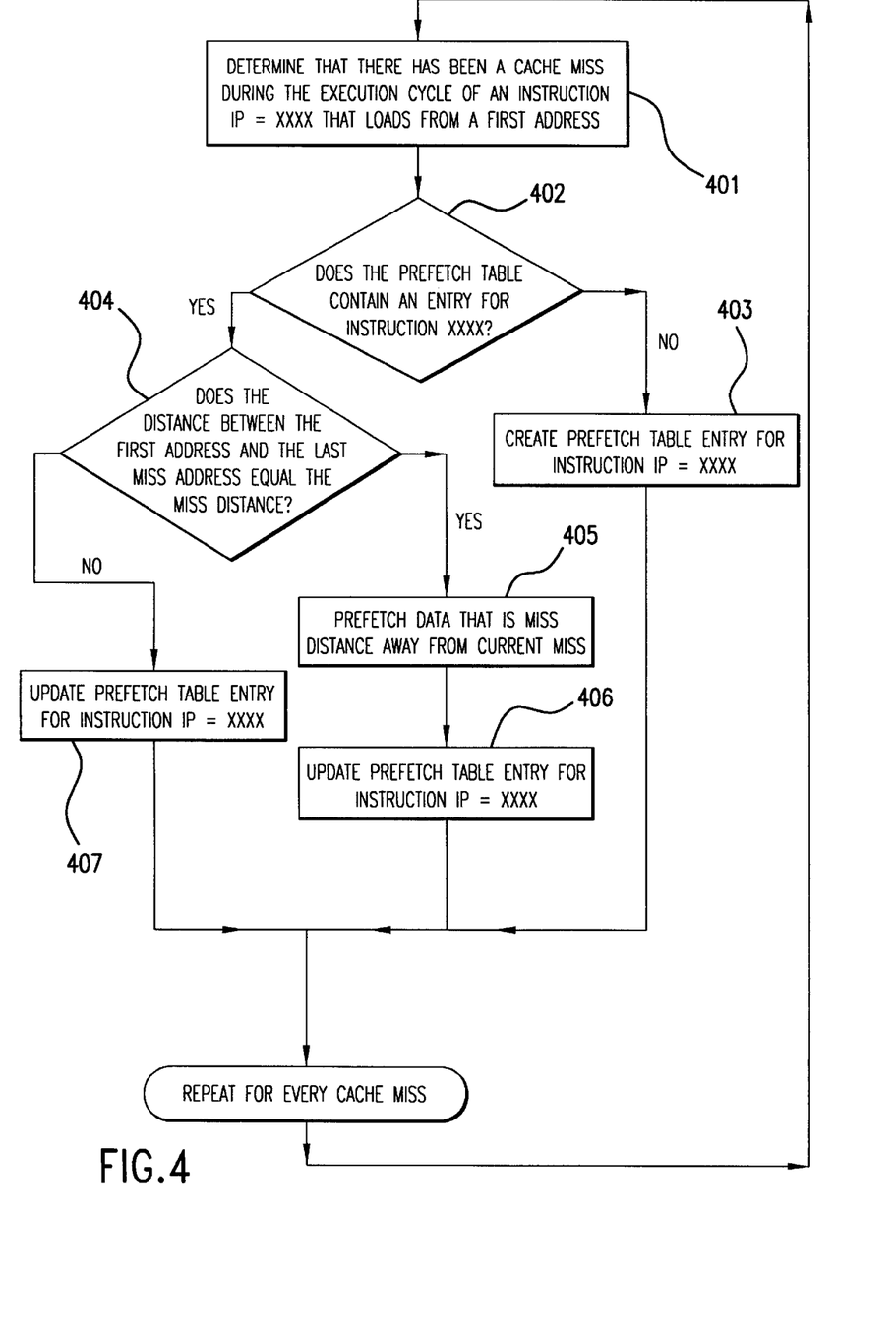
FIG. 4 is a flow diagram of a method of managing data prefetching according to an embodiment of the present invention.

FIG. 4 is a flow diagram of a method of managing data prefetching according to an embodiment of the present invention. This flow diagram may be used to illustrate how the prefetcher 120 of FIG. 1 may prefetch a data set such as that shown in FIG. 2. Assume for the sake of this example that the critical miss prefetch table 300 presently has no entries, that the processor 101 is executing an instruction at IP=XXXX for the first time, and that the first time instruction IP=XXXX executes it loads from address 1000 and every tenth address thereafter. Assume also that the cache is in the state shown in FIG. 2.

As shown in FIG. 4, the method includes determining that there has been a cache miss during the execution cycle of an instruction XXXX when it loads from the first address (401 of FIG. 4). Based on the state of the cache shown in FIG. 2, instruction IP=XXXX will result in a cache miss for address 1000. Next, the prefetch manager 122 will determine whether critical miss prefetch table 300 contains an entry for IP=XXXX (402 of FIG. 4). For the first cache miss, the critical cache miss table 300 will not contain an entry for IP=XXXX. According to an embodiment, an entry will then be created in the critical miss prefetch table 300 for IP=XXXX (403 of FIG. 4). In an embodiment, creating a new entry includes storing the last miss address (here 1000) in the table. In this embodiment, when a second miss later occurs for this instruction, the prefetch manager 122 will determine that the miss distance is equal to 30 (1030–1000) and will store this value in the miss distance field 303. Note from FIG. 2 that a miss will not occur for addresses 1010 and 1020 because these addressed are cached.

In another embodiment that uses a noise filtering technique, the last miss address is not stored until a second miss occurs for this instruction. In this embodiment, the miss repeated field 304 is used to indicate whether at least two misses have occurred for the instruction that corresponds to the entry. In this embodiment, a miss repeated bit is cleared when a new entry is created in critical miss prefetch table 300. When the next miss occurs for instruction XXXX at address=1030, the prefetcher checks critical miss prefetch table 300, determines that the table has an entry for instruction XXXX but that the miss repeated bit is not set for this entry, sets the miss repeated bit, and only then stores a value in last miss address field 302. In this case, the last miss address will be 1030. According to this embodiment, the last miss address will not even be recorded for noise misses that occur only once.

Assume for illustration that the noise filtering technique is not being used, that the second miss has already occurred, and thus that the entry contains a value of 30 as the miss distance and a value of 1030 as the last miss address. When the next miss occurs for IP=XXXX at address 1060, the prefetcher will determine if the critical cache miss table 300 has an entry for P=XXXX (402 of FIG. 4). The critical miss prefetcher will then determine if the address of the previous miss (in this example, the value of 1030 in last miss address field 302) is the miss distance away from the current miss address (404 of FIG. 4). Because the new miss is at the predicted miss distance, then in this embodiment the prefetch manager 122 prefetches the data that is the miss distance away from current miss (405 of FIG. 4). Thus, the data at address 1090 will be prefetched for later use when executing the instruction at IP XXXX.

In an embodiment of the invention, the data to be prefetched is prefetched into cache 130 and is marked to indicate that it has been prefetched. In an embodiment, the marking is done by using a bit in the cache entry for the data element, and this bit may referred to as a "virtual bit." In a further embodiment, the virtual bit may serve as a multi-purpose bit. For the purposes of maintaining the correct pattern in the critical miss prefetch table, if data loaded from the cache is marked as having been prefetched, then such a load is defined as, and understood by the prefetcher to be, a cache miss. That is, when such marked data is requested from the cache 130 during the execution of an instruction, the data will be provided from the cache 130 but the prefetch manager 122 will act as if a cache miss has occurred. In another embodiment, the prefetched data is loaded into a buffer (not shown) rather than into the cache. This buffer acts as a cache of the prefetched data. In this embodiment, a cache miss will occur even though the data is in the buffer, but because the data can be obtained from the buffer without loading from the RAM, execution of the instruction is still efficient.

After sending a request to prefetch the data, the prefetch manager 122 updates the critical prefetch table entry 300 for instruction IP=XXXX (406 of FIG. 4). For example, the prefetch manager will store the address of the current cache miss in the last miss address field.

If the miss distance stored in miss distance field 303 was different from the miss distance for the current miss (404 of FIG. 4), then in an embodiment the data is not prefetched. In this embodiment, the prefetch manger may update the critical miss prefetch table 300 entry for instruction IP=XXXX by storing a new miss distance and a new last miss address (407 of FIG. 4). An embodiment that includes a filter for preventing the recalculation of the miss distance based on noise misses is discussed below with regard to the mis-match field 514 of FIG. 5.

The method shown in FIG. 4 may then be repeated for every cache miss, including cache hits that would have been a miss but for this prefetch algorithm.

In another embodiment that uses a noise filtering technique, the miss distance is not used to prefetch data until is has been confirmed. In this embodiment, the confirmed field 305 of critical miss prefetch table 300 may be used to indicate whether two consecutive misses have occurred for the instruction at the miss distance. In this embodiment, a confirmed bit may be cleared when a new entry is created in critical miss prefetch table 300. Assume that a miss distance is stored in the entry when the second miss occurs for instruction XXXX. When the third miss occurs for instruction XXXX, the prefetcher checks critical miss prefetch table 300 and determines whether the address missed for the third miss is at the miss distance away from the last miss address. If the miss address distance stored in miss distance field 303 accurately predicted the miss distance for the current miss, then the confirmed bit is set. If the miss distance for the third miss was different than the miss distance stored in the entry, then the confirmed bit is not set at this time. According to this embodiment, the prefetch manager 122 does not cause data to be prefetched for an instruction unless the confirmed bit is set in the critical miss prefetch table 300 that corresponds to the instruction.

Figure 5:
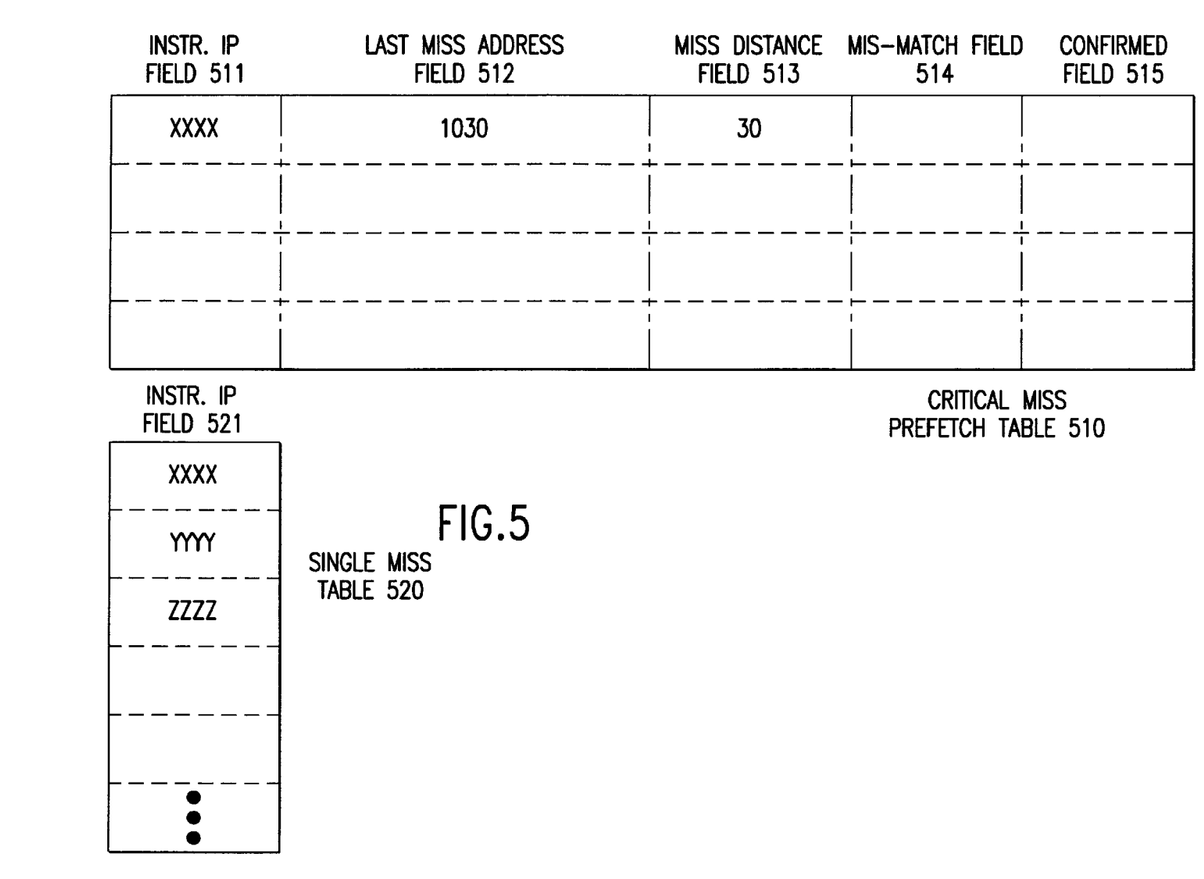
FIG. 5 is a partial block diagram of a single miss table and a critical miss prefetch table according to another embodiment of the present invention.

FIG. 5 is a partial block diagram of a single miss table 520 and a critical miss prefetch table 510 according to another embodiment of the present invention. This partial block diagram illustrates, among other things, two different noise filtering techniques. One technique limits the creation of new entries in the critical miss prefetch table 510 by using single miss table 520 to store the IP of instructions for which there is only a single miss. This technique, which may be referred to as the "two-table approach," allows for a smaller table size. The second technique uses mis-match field 514 to prevent the recalculation of the miss distance based on noise misses. These techniques may be used separately or in combination.

The two-table approach will now be described. In the embodiment illustrated, critical miss prefetch table 510 allows for four entries and single miss table 520 allows for more than four entries. Each entry in single miss table 520 may have a single field, instruction IP field 521. Thus, each entry in single miss table 520 may store an instruction pointer for an instruction (e.g., XXXX, YYYY, ZZZZ, etc). Critical miss prefetch table 510 is similar to critical miss prefetch table 300 of FIG. 3. Critical miss prefetch table 510 has an instruction IP field 511, last miss address field 512, miss distance field 513, mis-match field 514, and confirmed field 515. Critical miss prefetch table 500 does not have the miss repeated field 304 shown in critical miss prefetch table 300 because the functionality of the miss repeated field is preformed by the single miss table 520. In this embodiment, when a miss occurs, the prefetcher 120 determines if critical miss prefetch table 510 has an entry for the instruction that caused the miss. If critical miss prefetch table 510 does not have an entry for the instruction, then the prefetcher 120 determines if single miss table 520 has an entry for the instruction. If single miss table 520 does not have an entry for the instruction, then an entry is created for the instruction in single miss table 520. If single miss table 520 does have an entry for the instruction, then an entry is created in critical miss prefetch table 510 for the instruction. When the noise filtering technique of this embodiment is used, an entry will not be created for an instruction in critical miss prefetch table 510 unless two misses have occurred for the instruction. (More precisely, an entry will not be created for an instruction in critical miss prefetch table 510 unless single miss table 520 has a record of an earlier miss that occurred for the instruction.) Thus, an entry will not be created in critical miss prefetch table 510 if the instruction only caused a single noise miss.

The mis-match field 514 of critical miss prefetch table 510 is used to prevent the recalculation of the miss distance based on noise misses. If a miss distance has been established for an instruction and a miss later occurs that is not at the miss distance, this may indicate the start of a new miss pattern, in which case the miss distance should be recalculated. The miss at the new distance may, however, simply be a noise miss, in which case the miss distance should not be recalculated. For example, if we modified the data set shown in FIG. 2 so that the address 1070 was not stored in the cache 130 for some reason unrelated to the true pattern of miss distances for the instruction, then a load of address 1070 would cause a miss with a miss distance of 10 (1070−1060=10) even though the true pattern of miss distances for the instruction has a miss distance of 30. According to an embodiment, whenever a miss occurs at a distance other than the distance stored in the miss distance field 513, the prefetcher checks a match bit in mis-match field 514. If the match bit is not set in this situation, then the prefetcher sets the match bit and does not store a new distance in the miss distance field 513. If the match bit is set, then the prefetcher stores a the new miss distance in the miss distance field 513 and clears the match bit. Finally, the miss bit is cleared whenever a miss occurs at the distance stored in miss distance field 513. Thus, a single miss at a new miss distance is assumed to be a noise miss but two misses in a row at a distance other than the miss distance cause the mis-match bit to be recalculated.

Figure 6:
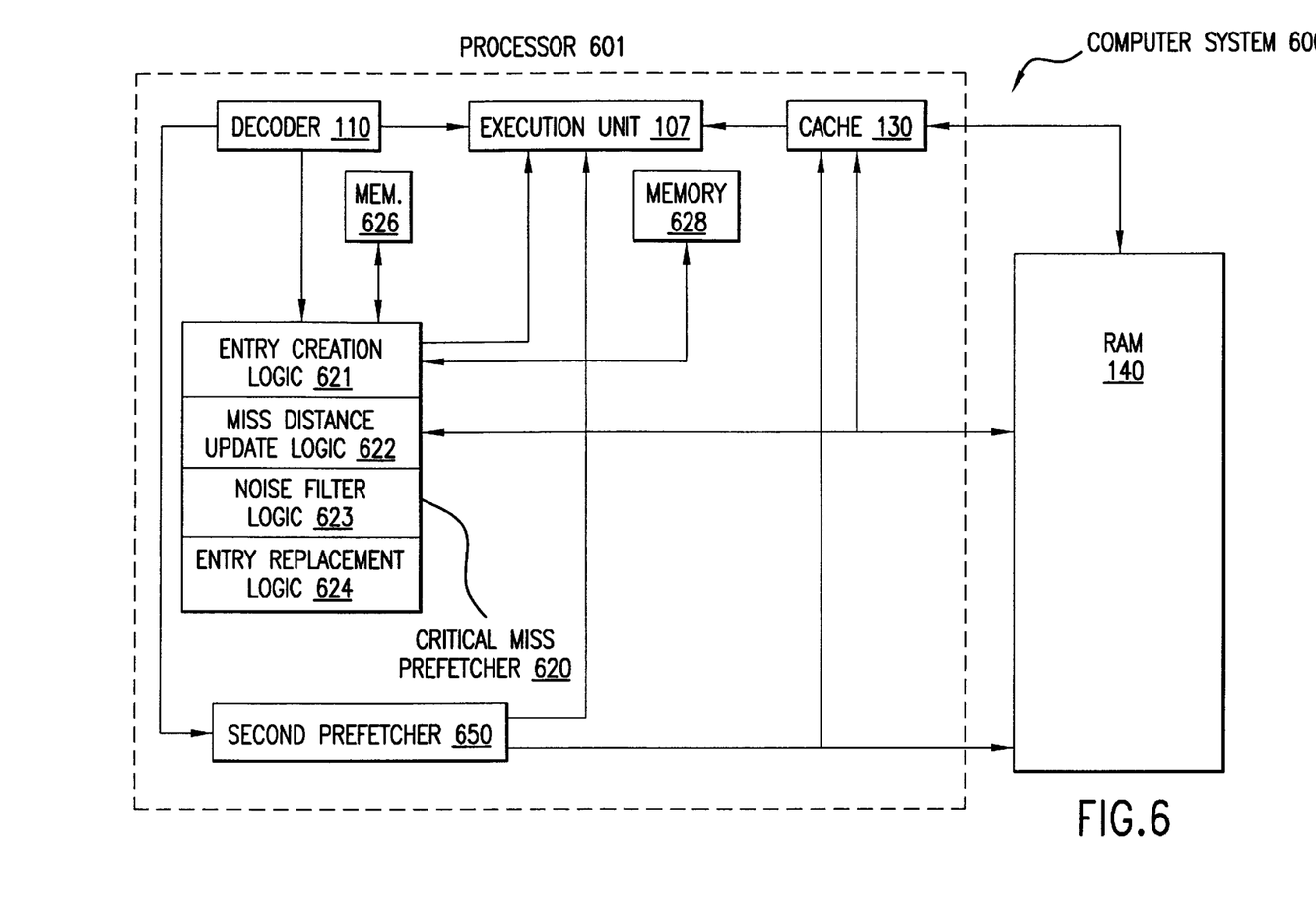
FIG. 6 is a partial block diagram of a computer system having a critical miss prefetcher according to another embodiment of the present invention.

FIG. 6 is a partial block diagram of a computer system 600 having a critical miss prefetcher 620 according to another embodiment of the present invention. This partial block diagram illustrates, among other things, a second prefetcher that may operate in conjunction with the critical miss prefetcher 620, the splitting of the critical miss table across two memories, and the logic contained in a critical miss prefetcher. In other embodiments, one or two of these three aspects of FIG. 6 may be used separately.

Computer system 600 may have a processor 601 that has a decoder 110 and an execution unit 107 which may be similar to computer system 100 of FIG. 1. In addition, computer system 600 may have a cache 130 and RAM 140. Cache 130 is part of processor 601, but in other embodiments cache 130 may be outside of processor 601. Processor 601 may have a second prefetcher 650 that is coupled to decoder 110, execution unit 107, and RAM 140. Critical miss prefetcher 620 may have entry creation logic 621, miss distance update logic 622, noise filter logic 623, and entry replacement logic 624. Processor 601 may have a memory 626 and a memory 628 which are coupled to and used by critical miss prefetcher 620.

Second prefetcher 650 may contain prefetch logic to prefetch a data element for use by an instruction. In an embodiment, second prefetcher 650 operates in conjunction with the critical miss prefetcher 620 but uses a different prefetching mechanism. For example, second prefetcher 650 may be a hint buffer, and the critical miss prefetcher and hint buffer may both be able to prefetch data for a program at the same time. In this embodiment, the critical miss prefetcher and hint buffer may compliment each other.

In an embodiment, entry creation logic 621 may be a circuit to create an entry for the instruction in a critical miss prefetch table if the instruction has caused more than one cache miss. In a further embodiment; entry creation logic 621 may determine that an instruction caused more than one cache miss based at least in part on the contents of a single miss table. In an embodiment, miss distance update logic 622 contains a circuit to record the miss distance in the prefetch table entry for an instruction. In a further embodiment, miss distance update logic 622 also contains a circuit to record that the miss distance has been confirmed for at least two consecutive misses for the instruction. In an embodiment, noise filter logic 623 may be a circuit that prevent the contamination of the critical miss prefetch table and/or the miss data by noise misses.

In an embodiment, entry replacement logic 624 is a circuit to select entries in the prefetch table for replacement by using the information stored in the miss repeated field and confirmed field of the entries. An entry would need to be replaced, for example, if a new entry is being created but the table is fill. In a further embodiment, the critical miss prefetch table has a miss repeated field and a confirmed field, and the entry replacement logic 624 first chooses for replacement any entries in the table for which a miss repeated bit is not set (i.e., the miss field does not indicate that two misses have occurred for this entry). In a still further embodiment, the entry replacement logic 624 next chooses for replacement any entries for which a confirmed bit is not set (i.e., the confirmed field does not indicate that the miss distance has been confirmed). In a further embodiment, entries are chosen for replacement within each category in a first-in-first-out (FIFO) manner.

Figure 7:
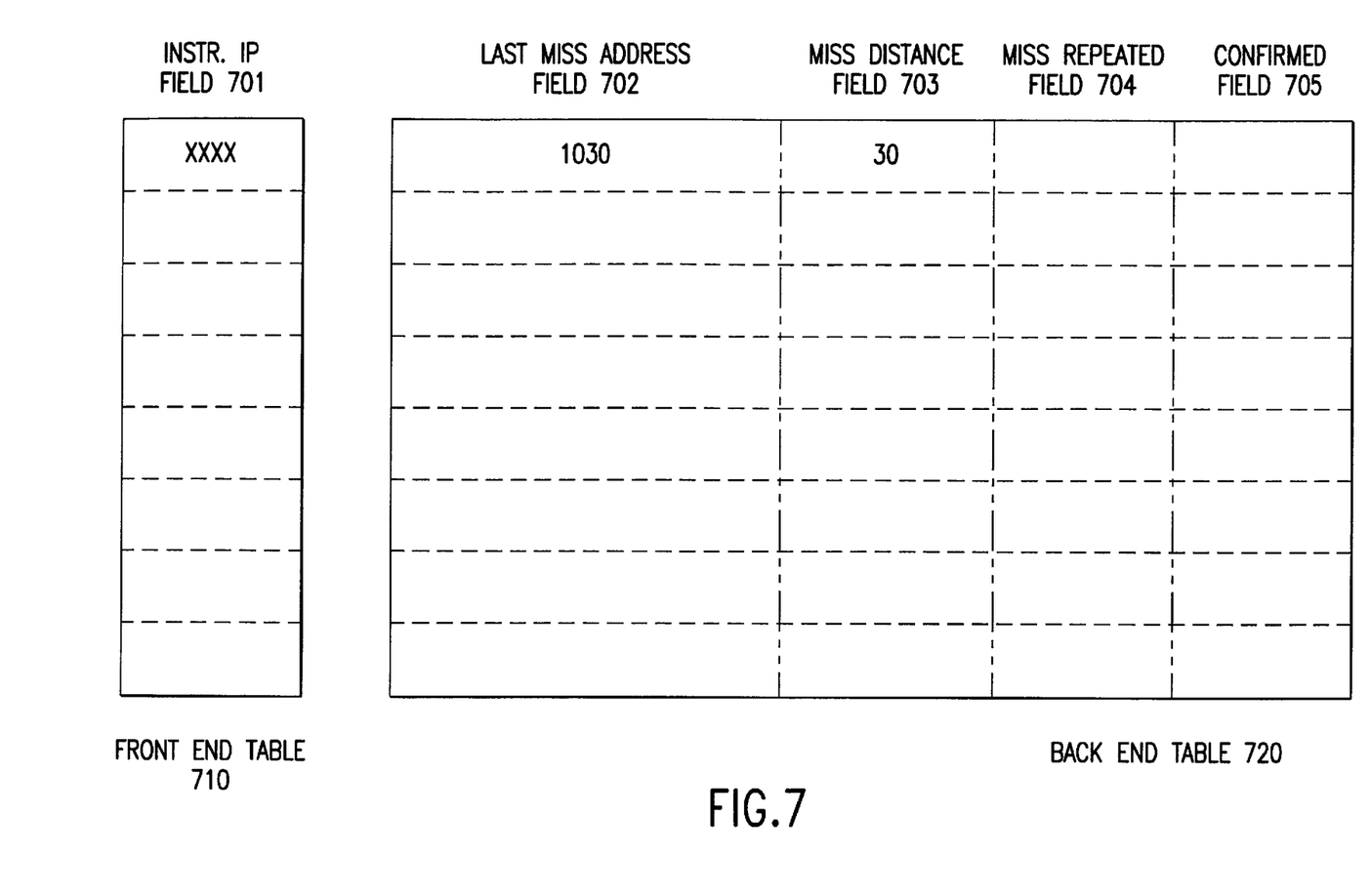
FIG. 7 is a partial block diagram of a front end table and a back end table according to another embodiment of the present invention.

FIG. 7 is a partial block diagram of a front end table 710 and a back end table 720 according to another embodiment of the present invention. In an embodiment, an indexing scheme is used that improves the efficiency of the critical miss prefetcher by breaking the critical miss prefetch table into two parts and locating part of the critical miss table (the front end table) at the front of the processor's pipeline. In this embodiment, front end table 710 and back end table 720 both allow for the same number of entries, and each entry in front end table 710 corresponds to an entry in back end table 720. As before, each entry in the tables relates to an instruction. In an embodiment, the entries in front end table 710 contain an instruction pointer value in an instruction IP field 701. In this embodiment, the back end table 720 contains a last miss address field 702, a miss distance field 703, a miss distance field 703, a miss repeated field 704, and a confirmed field 705. Back end table 720 constitutes the main prefetch table but it does not store any information identifying the instruction to which the entry is related. The prefetcher determines the location of an entry to be read or updated in the back end table 720 by searching for the IP of the instruction in the front end table 710. For example, to update the last miss address field 702 of the entry for XXXX in back end table 720, the prefetcher determines that the first entry in both tables is related to the instruction at IP=XXXX by finding the value XXXX in the first entry of the front end table 710. In this way, the front end table 710 and back end table 720 may be treated as if they were a single table.

In an embodiment, memory 626 of FIG. 6 stores front end table 710 and memory 628 stores back end table 720. In a further embodiment, the memory 628 is located closer to the cache 130 than to the decoder 110 and the memory 626 is located closer to the decoder 110 than the cache 130. Thus, the IP, which may be 32 bits, does not have to be propagated all the way down the pipeline.

Figure 8:
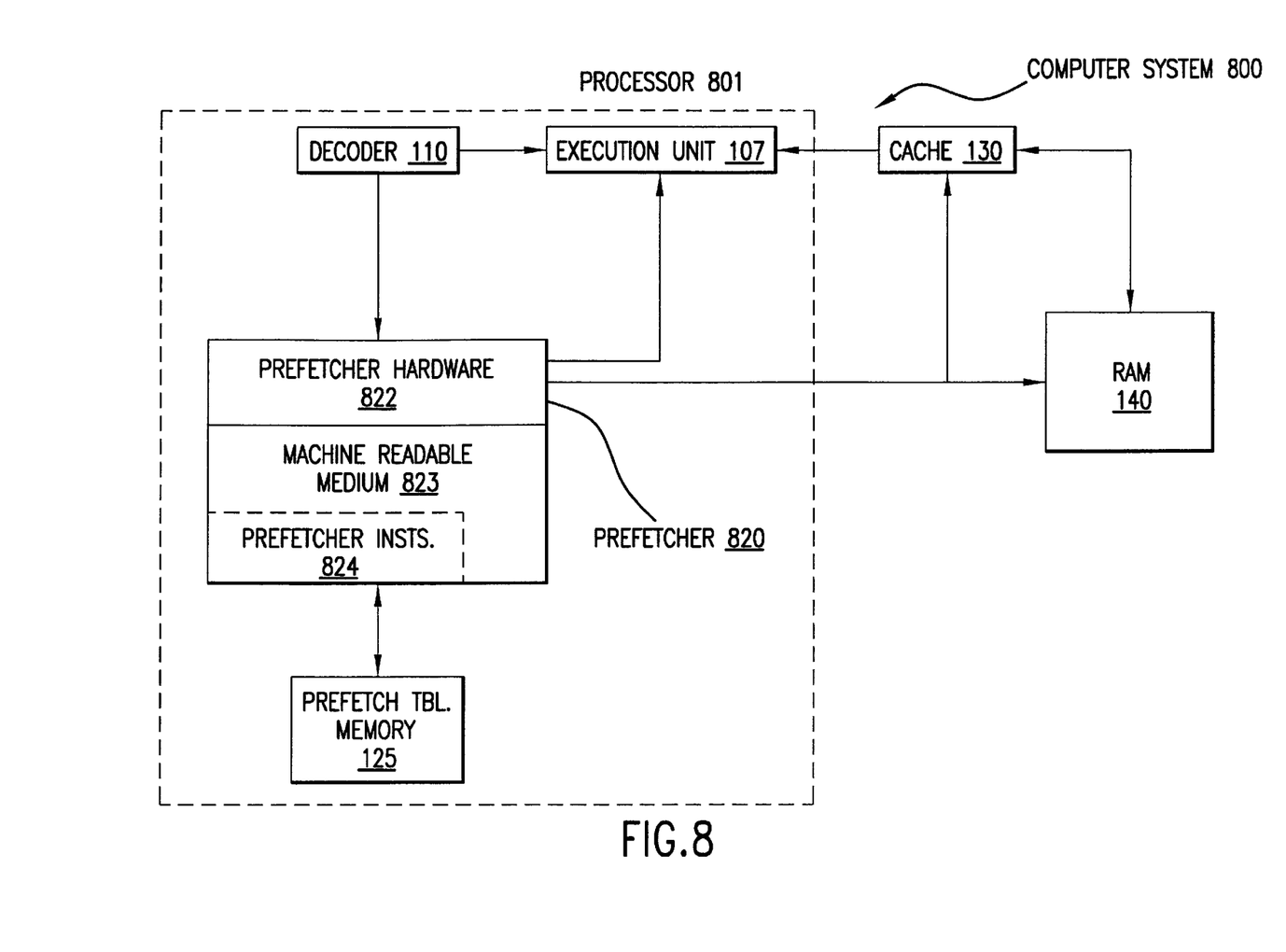
FIG. 8 is a partial block diagram of a computer system having a prefetcher according to another embodiment of the present invention.

FIG. 8 is a partial block diagram of a computer system 800 having a prefetcher according to another embodiment of the present invention. Computer system 800 may have a processor 801 that has a decoder 110, an execution unit 107, and a prefetch table memory 125 which may be similar to computer system 100 of FIG. 1. In addition, computer system 800 may have a cache 130 and RAM 140. Processor 801 may also have a prefetcher 820 that includes prefetcher hardware 822 and a machine readable medium 823. Machine readable medium 823 may store prefetcher instructions 824 which may be executable instructions that are executed by prefetcher hardware 822 to perform one or more of the critical miss prefetch techniques described above. As used herein, the phrase "executable instructions" is meant to encompass object code, source code, firmware, microcode, etc., and includes instructions stored in a compressed and/or encrypted format, as well as instructions that have to be compiled for installed by an installer before being executed by the processor.

Embodiments of the present invention relate to a critical miss prefetcher. The critical miss prefetcher prefetches data for an instruction based on the distance between cache misses for the instruction. The invention uses the predictability of the miss distance to determine the addresses to be prefetched. Several embodiments of the present invention are specifically illustrated and/or described herein. However, it will be appreciated that modifications and variations of the present invention are covered by the above teachings and within the purview of the appended claims without departing from the spirit and intended scope of the invention. For example, any combination of one or more of the aspects described above may be used. In addition, the invention may be used with physical address or linear addresses. In addition, the prefetcher may use a multiple of the miss distance when determining the address to be prefetched.

We claim:

1. An apparatus comprising:
   a prefetcher to prefetch data corresponding to an instruction based on the distance between cache misses caused by the instruction, wherein the prefetcher comprises a memory to store a prefetch table comprising one or more entries that include the distance between cache misses caused by an instruction, and wherein the prefetch table only comprises an entry corresponding to an instruction if the instruction has caused at least two cache misses.

2. The prefetcher of claim 1, wherein the addresses of the prefetched data are determined based on the distance between cache misses recorded in the prefetch table for the instruction.

3. The prefetcher of claim 1, wherein the prefetcher further comprises a noise filter to prevent at least one type of noise miss from changing the miss distance used to prefetch data.

4. The prefetcher of claim 1, wherein the prefetch table does not store any information identifying an instruction to which each entry is related.

5. The prefetcher of claim 1, wherein entries in the prefetch table comprise a miss repeated field to indicate whether more than one miss has been detected for the instruction and a confirmed field to indicate whether the distance stored in the miss distance field was also the distance between earlier cache misses, and wherein the prefetcher further comprises replacement logic to select entries in the prefetch table for replacement by using the information stored in the miss repeated field or the confirmed field of the entries.

6. The prefetcher of claim 1, wherein the prefetcher stores prefetched data in a cache with an indication that the data has been prefetched.

7. A prefetcher comprising:
   a first memory to store a prefetch table having a plurality of entries, each comprising information related to an instruction, the entries comprising a miss distance field to store the distance between a first address whose access by the instruction caused a first cache miss and a second address whose access by the instruction caused a second cache miss, the second cache miss being the next cache miss for the instruction after the first cache miss, wherein the prefetch table does not store any information identifying the instruction to which the entry is related;
   a second memory to store a front end table having a plurality of entries, each comprising instruction pointers, wherein each entry in the front end table corresponds to an entry in the prefetch table; and
   a prefetch manager coupled to the first memory to manage the prefetch table.

8. The prefetcher of claim 7, wherein entries in the prefetch table further comprise a miss repeated field to indicate whether more than one miss has been detected for the instruction.

9. The prefetcher of claim 7, wherein entries in the prefetch table further comprise a confirmed field to indicate whether the distance stored in the miss distance field was also the distance between said second address and a third address whose access by the instruction caused a third cache miss, the third cache miss being the next cache miss for the instruction after the second cache miss.

10. The prefetcher of claim 7, wherein entries in the prefetch table further comprise a mis-match field to indicate whether the previous miss was at a distance that matched the distance stored in the miss distance field.

11. The prefetcher of claim 7, wherein:
    entries in the prefetch table further comprise a miss repeated field to indicate whether more than one miss has been detected for the instruction;
    entries in the prefetch table further comprise a confirmed field to indicate whether the distance stored in the miss distance field was also the distance between said second address and a third address that was the subject of a first cache miss, the third cache miss being the next cache miss for the instruction after the second cache miss; and
    the prefetch manager comprises replacement logic to select entries in the prefetch table for replacement by using the information stored in the miss repeated field and confirmed field of the entries.

12. The prefetcher of claim 7, wherein the prefetcher is part of a system which includes a cache and a decoder, wherein the first memory is located closer to the cache than to the decoder, and wherein the second memory is located closer to the decoder than to the cache.

13. The prefetcher of claim 7, wherein the prefetch table only contains an entry corresponding to an instruction if the instruction has caused at least two cache misses.

14. The prefetcher of claim 7, wherein entries in the prefetch table further comprise a miss repeated field to indicate whether more than one miss has been detected for the instruction and a confirmed field to indicate whether the distance stored in the miss distance field was also the distance between said second address and a third address that was the subject of an earlier cache miss, and wherein the prefetcher further comprises replacement logic to select entries in the prefetch table for replacement by using the information stored in the miss repeated field and confirmed field of the entries.

15. The prefetcher of claim 7, wherein the prefetcher stores prefetched data in a cache with an indication that the data has been prefetched.

16. A processor comprising:
   a prefetcher to prefetch data for use by an instruction based on a recorded distance between cache misses that were generated by the instruction;
   an execution unit to execute the instruction;
   a cache;
   a decoder;
   a first memory to store a prefetch table comprising an entry that stores prefetch information related to an instruction but does not store information identifying the instruction to which the entry is related, the first memory being coupled to the prefetcher and located closer to the cache than to the decoder; and
   a second memory to store a front end table comprising an entry that corresponds to an entry in the prefetch table, wherein the front end table entry stores information identifying the instruction to which the entry is related, and wherein the second memory is coupled to the prefetcher and located closer to the decoder than the cache.

17. The processor of claim 16, wherein the prefetcher comprises a first circuit to create an entry for the instruction in a prefetch table if the instruction has caused more than one cache miss, wherein the determination that the instruction has caused more than one cache miss is based at least in part on the contents of a single miss table.

18. The processor of claim 16, wherein the prefetcher comprises:
   a first circuit to create an entry for the instruction in a prefetch table if the instruction has caused more than one cache miss, wherein the determination that the instruction has caused more than one cache miss is based at least in part on the contents of a single miss table;
   a second circuit to record the miss distance in the prefetch table entry for the instruction; and
   a third circuit to record that the miss distance has been confirmed for at least two consecutive misses for the instruction.

19. The processor of claim 16, wherein the processor further comprises a second prefetcher to prefetch a data element for use by the instruction, wherein the second prefetcher uses a different prefetching mechanism and operates in conjunction with the prefetcher.

20. The processor of claim 16, wherein entries in the prefetch table further comprise a miss repeated field to indicate whether more than one miss has been detected for the instruction and a confirmed field to indicate whether the distance stored in the miss distance field was also the distance between earlier cache misses, and wherein the prefetcher further comprises replacement logic to select entries in the prefetch table for replacement by using the information stored in the miss repeated field and confirmed field of the entries.

21. The processor of claim 16, wherein the prefetcher stores prefetched data in a cache with an indication that the data has been prefetched.

22. A method of managing data prefetching, the method comprising:
   determining that there has been a cache miss during the execution cycle of an instruction that loads from a first address;
   determining whether a first prefetch table contains an entry for the instruction, the entry storing a miss distance, the entry storing a second address whose access by the instruction last caused a cache miss for the instruction, and the entry storing a confirmation field to indicate whether the stored miss distance was confirmed;
   if the first prefetch table contains an entry for the instruction, determining whether to prefetch data based in part on information stored in the entry; and
   if the first prefetch table does not contain an entry for the instruction, creating a new entry in the first prefetch table for the instruction, wherein the new entry will only replace an entry in the prefetch table that has a confirmation field indicating that the miss distance stored in that entry being replaced was confirmed if the other entries in the prefetch table also have a confirmation field that indicates that the miss distance stored in those other entries was confirmed.

23. The method of claim 22, wherein determining whether to prefetch data comprises determining that a prefetch request should be sent if the distance between the first address and the second address equals the stored miss distance.

24. The method of claim 22, wherein determining whether the first prefetch table contains an entry for the instruction comprises determining if an entry in a second prefetch table contains information identifying the instruction, wherein the second prefetch table resides in a different memory than the first prefetch table.

25. The method of claim 22, wherein the entry for the instruction in the first prefetch table contains a mis-match field, and wherein the mis-match field indicates whether the last miss for the instruction occurred at the miss distance stored in the entry when the last miss was processed.

26. The method of claim 25, wherein the method further comprises:
   determining that the distance between the first address and the second address is not equal to the miss distance;
   if the mis-match field indicates that the last miss had occurred at the stored miss distance, updating the mis-match field to indicate that the last miss for the instruction did not occur at the stored miss distance; and
   if the mis-match field indicates that the last miss had not occurred at the stored miss distance, storing the miss distance in the miss distance field and updating the mis-match field to indicate that the last miss for the instruction did not occur at the stored miss distance.

27. The method of claim 22, wherein an entry is created in the first prefetch table for the instruction only if the first prefetch table does not contain an entry for the instruction and a second prefetch table does contain an entry for the instruction, and wherein the method further comprises creating an entry in the second prefetch table for the instruction if the first prefetch table does not contain an entry for the instruction and the second prefetch table does not contain an entry for the instruction.

28. The method of claim 22, wherein the first prefetch table does not store any information identifying the instruction to which the entry is related.

* * * * *